US009720491B2

(12) United States Patent
Mulla et al.

(10) Patent No.: US 9,720,491 B2
(45) Date of Patent: Aug. 1, 2017

(54) TRACKING MISSED PERIODIC ACTIONS ACROSS STATE DOMAINS

(71) Applicant: Intel Corporation, Santa Clara, CA (US)

(72) Inventors: Dean Mulla, Saratoga, CA (US); Daniel G. Borkowski, Lunenburg, MA (US); Krishnakanth V. Sistla, Beaverton, OR (US); Victor Wu, Sunnyvale, CA (US); Manev Luthra, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 14/752,841

(22) Filed: Jun. 27, 2015

(65) Prior Publication Data

US 2016/0378173 A1    Dec. 29, 2016

(51) Int. Cl.
*G06F 3/06* (2006.01)
*G06F 1/32* (2006.01)

(52) U.S. Cl.
CPC .......... *G06F 1/3296* (2013.01); *G06F 1/3225* (2013.01); *G06F 1/3237* (2013.01); *G06F 1/3275* (2013.01); *G06F 3/0604* (2013.01); *G06F 3/0625* (2013.01); *G06F 3/0653* (2013.01); *G06F 3/0673* (2013.01)

(58) Field of Classification Search
CPC .... G06F 1/3296; G06F 1/3275; G06F 1/3225; G06F 1/3287; G06F 1/3288; G06F 11/106; G06F 11/1052; G06F 11/1048; G06F 11/0757; G06F 11/076; G06F 11/073; G06F 3/0625; G06F 3/0673; G06F 3/0604; G06F 3/0653; G06F 3/0614; G06F 3/0619; G06F 3/0634; G06F 3/0674; G06F 3/0676; G06F 3/0677; G06F 3/0679
See application file for complete search history.

(56) References Cited

U.S. PATENT DOCUMENTS

| 7,020,038 B2* | 3/2006 | Shieh ................ G11C 11/40603 365/189.07 |
| 2003/0191888 A1* | 10/2003 | Klein .................... G06F 1/3225 711/105 |
| 2004/0243886 A1 | 12/2004 | Klein |

(Continued)

FOREIGN PATENT DOCUMENTS

WO    2010-151297 A1    12/2010

OTHER PUBLICATIONS

International Search Report and Written Opinion for International Patent Application No. PCT/US2016/034291, mailed Aug. 31, 2016, 11 pages.

*Primary Examiner* — Michael Krofcheck
(74) *Attorney, Agent, or Firm* — Jordan IP Law, LLC

(57) ABSTRACT

Systems and methods may provide for determining, in a first domain that manages a state of a second domain, that the second domain is in the state and determining, in the first domain, that a periodic action has been scheduled to occur in the second domain while the second domain is in the state. Additionally, the periodic action may be documented as a missed event with respect to the second domain. In one example, documenting the periodic action as a missed event includes incrementing a missed event counter.

20 Claims, 3 Drawing Sheets

(56) References Cited

U.S. PATENT DOCUMENTS

| | | | |
|---|---|---|---|
| 2011/0289332 A1* | 11/2011 | Bondalapati | G06F 1/3228 713/323 |
| 2014/0040680 A1* | 2/2014 | Takaku | G06F 11/106 714/54 |
| 2014/0059405 A1 | 2/2014 | Syu et al. | |
| 2014/0211579 A1 | 7/2014 | Lovelace | |
| 2014/0304566 A1* | 10/2014 | Henderson | G06F 1/3275 714/764 |
| 2015/0278011 A1* | 10/2015 | Keppel | G06F 11/106 714/754 |
| 2016/0054937 A1* | 2/2016 | Tuers | G11C 16/3495 711/103 |
| 2016/0246679 A1* | 8/2016 | Kim | G06F 11/1402 |

* cited by examiner

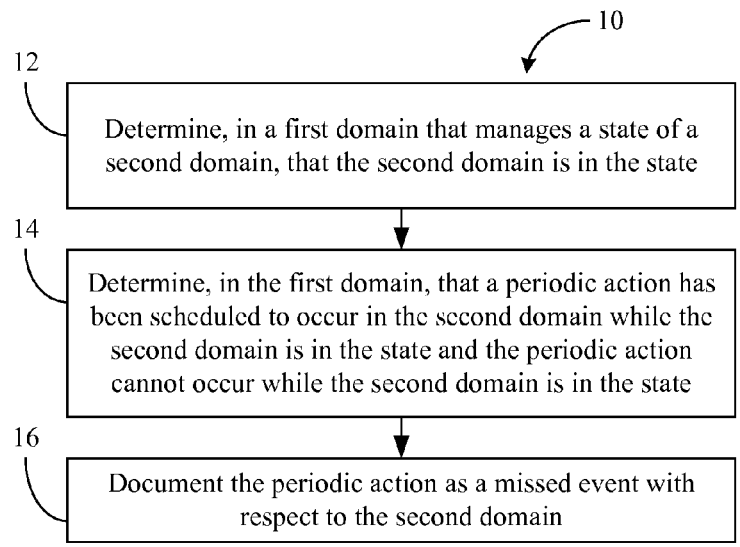
FIG. 1
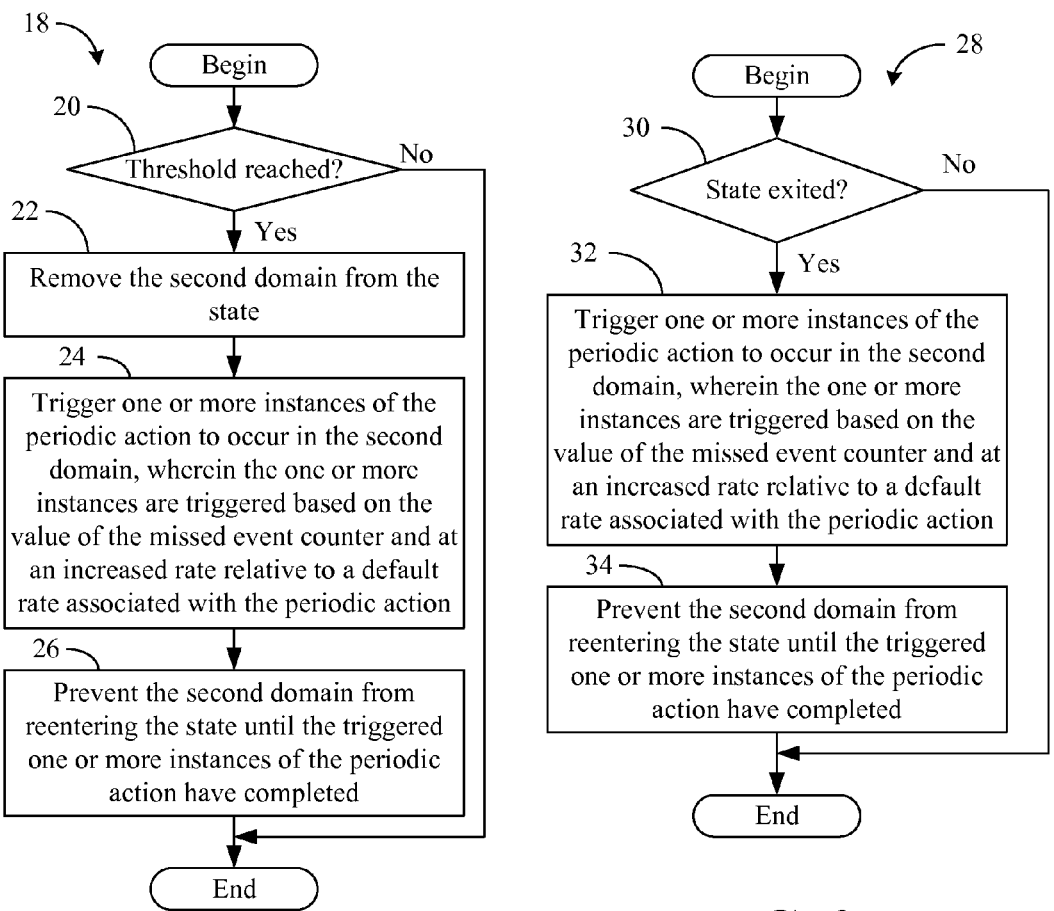
FIG. 2A
FIG. 2B

US 9,720,491 B2

TRACKING MISSED PERIODIC ACTIONS ACROSS STATE DOMAINS

TECHNICAL FIELD

Embodiments generally relate to the scheduling of periodic actions or activities. More particularly, embodiments relate to tracking missed periodic actions across state domains.

BACKGROUND

Due to the high integration density of contemporary computer memory chips, individual memory cell structures may be small enough to be vulnerable to temperature effects, neighboring cell structure activity, cosmic rays and/or alpha particle emissions. The errors caused by these phenomena are considered "soft errors" that may be corrected via "memory scrubbing". Memory scrubbing may involve reading from each memory location, correcting bit errors (if any) with an error-correcting code (ECC), and writing the corrected data back to the same location. Certain types of high end servers may attempt to guarantee memory scrubbing to occur on a periodic basis such as every twenty-four hours. Meeting such a guarantee, however, may prevent the memory subsystem from entering reduced power states (e.g., Advanced Configuration and Power Interface/ACPI package C-states in which the memory subsystem clock is deactivated) for extended periods of time. As a result, power consumption may be negatively impacted. Moreover, conventional memory scrubbing solutions may be unaware of missed scrub operations due to the scrub scheduling logic being located in the portion of the memory subsystem that enters the reduced power state.

BRIEF DESCRIPTION OF THE DRAWINGS

The various advantages of the embodiments will become apparent to one skilled in the art by reading the following specification and appended claims, and by referencing the following drawings, in which:

FIG. 1 is a flowchart of an example of a method of tracking missed periodic actions across state domains according to an embodiment;

FIGS. 2A and 2B are flowcharts of examples of accelerating completion of missed periodic actions according to embodiments;

DESCRIPTION OF EMBODIMENTS

Figure 3:
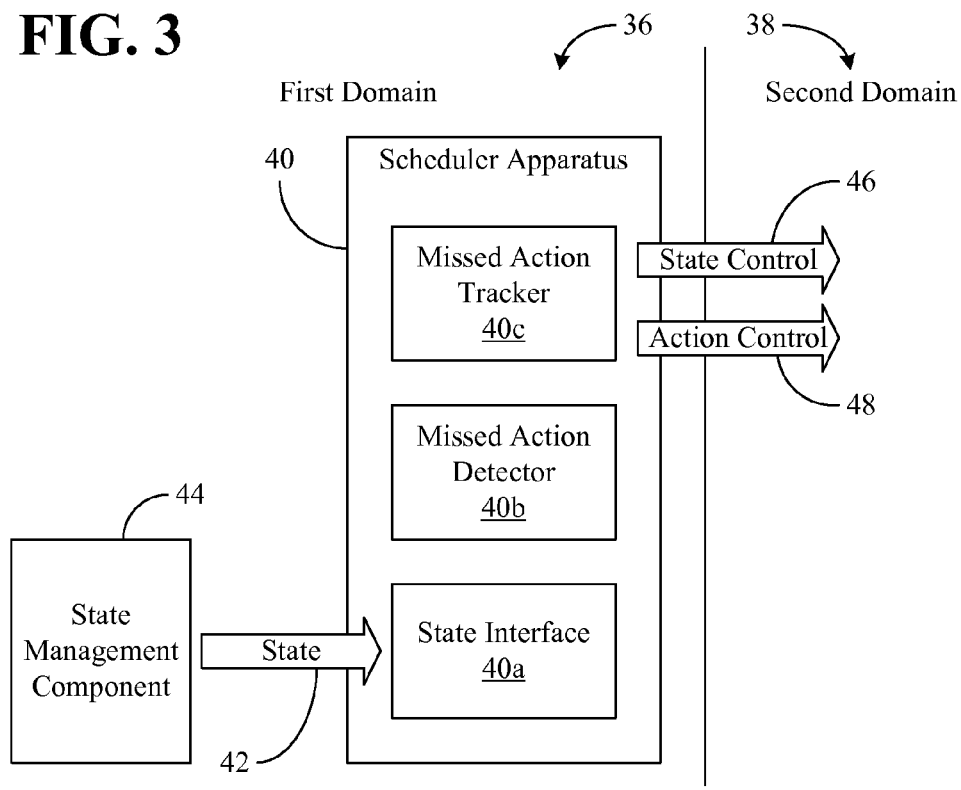
FIG. 3 is a block diagram of an example of a scheduler apparatus according to an embodiment.

Turning now to FIG. 1, a method 10 of tracking missed periodic actions across state domains is shown. The method 10 may generally be implemented in any type of system that conducts periodic actions or activities that are potentially prevented and/or precluded from occurring by reduced power states, increased performance states, and so forth. Thus, the method 10 may be implemented in computing systems, automotive systems, wearable devices, etc., or any combination thereof. Illustrated processing block 12 determines, in a first domain (e.g., an "always on" clock domain) that manages a state of a second domain, that the second domain is in the state. The state may generally be any type of state and/or condition in which the periodic action cannot be completed by the portion of the system that is in the state. As already noted, the state may be a reduced power state (e.g., ACPI package C-state in which the clock to the second domain is deactivated), an increased performance state (e.g., turbo frequency state), etc.

Block 14 may determine, in the first domain, that a periodic action has been scheduled to occur in the second domain while the second domain is in the state. The periodic action may include any type of action that is precluded and/or prevented from occurring while the second domain is in the state. Thus, the periodic action might be a memory scrubbing operation, a calibration, a compensation value reevaluation, etc., that does not occur while the second domain is in a reduced power state or an increased performance state. The periodic action may be documented at block 16 as a missed event with respect to the second domain. As will be discussed in greater detail, block 16 may include incrementing a missed event counter to document the missed event. Detecting the missed event in the first domain, which may not enter the state in question, may therefore enable the illustrated method 10 to track and accelerate completion of missed periodic actions so that guarantees such as, for example, patrol scrubbing guarantees may be met without interfering with the ability of the system to achieve reduced power and/or enhanced performance.

The method 10 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 10 may be written in any combination of one or more programming languages, including an object oriented programming language such as JAVA, SMALLTALK, C++ or the like and conventional procedural programming languages, such as the "C" programming language or similar programming languages.

FIG. 2A shows one approach to a method 18 of accelerating completion of missed periodic actions documented via a method such as, for example, the method 10 (FIG. 1), already discussed. The method 18 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 20 determines whether a missed event counter has reached a threshold. If so, block 22 may remove the second domain from a given state. Thus, block 22 might include waking the second domain (e.g., from a reduced power state), lowering an operating frequency of the second domain (e.g., from a turbo boost frequency of an increased performance state), and so forth.

Block 24 may trigger one or more instances of the periodic action to occur in the second domain, wherein the one or more instances are triggered based on the value of the missed event counter and at an increased rate relative to a default rate associated with the periodic action. For example, if the value of the missed event counter is a particular number (e.g., ten), block 24 may involve triggering ten or more instances of the periodic action prior to placing the second domain back on the original schedule. In this regard, block 24 may also trigger the periodic actions until the missed event counter reaches a negative value in order to place the second domain ahead of the original schedule (e.g., in anticipation of future missed periodic actions). Block 24 may therefore also include receiving an acknowledgement of a completion of the triggered one or more instances of the periodic action and decrementing the missed events counter in response to the acknowledgment. Of particular note is that the default rate associated with the periodic action may be considerably lower than the rate at which block 24 operates. For example, the periodic action may be a patrol scrub scheduled to occur in every memory location at least once every twenty-four hours (e.g., default rate equal to number of memory locations/24 hours in terms of scrubs per hour), whereas the illustrated triggering at block 24 may occur as quickly as memory scrubs may be conducted (e.g., on the order of tens of nanoseconds). Illustrated block 26 also prevents the second domain from reentering the state until the triggered one or more instances of the periodic action have completed. Because the missed periodic actions may be conducted at an accelerated rate, any negative impact (e.g., power, performance) associated with block 26 may be minimal.

FIG. 2B shows another approach to a method 28 of accelerating completion of missed periodic actions. The method 28 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 30 determines whether the second domain has exited a particular state (e.g., due to some other condition and/or trigger). If so, block 32 may trigger (e.g., opportunistically) one or more instances of the periodic action to occur in the second domain, wherein the one or more instances are triggered based on the value of a missed event counter and at an increased rate relative to a default rate associated with the periodic action. Thus, if the value of the missed event counter is a particular number (e.g., ten), block 32 may involve triggering ten or more instances of the periodic action in order to place the second domain either back on or ahead of the original schedule. Block 32 may therefore also include receiving an acknowledgement of a completion of the triggered one or more instances of the periodic action and decrementing the missed events counter in response to the acknowledgment. The second domain may be prevented at block 34 from reentering the state until the triggered one or more instances of the periodic action have completed.

Turning now to FIG. 3, a first domain 36 is shown, wherein the first domain 36 manages a state of a second domain 38. The illustrated first domain 36 includes a scheduler apparatus 40 (40a-40c) having a state interface 40a to determine, based on a state information 42 from a state management component 44, that the second domain 38 is in a state such as, for example, a reduced power state, an increased performance state, etc. The scheduler apparatus 40 may also include a missed action detector 40b to determine that a periodic action has been scheduled to occur in the second domain 38 while the second domain 38 is in the state. The periodic action may be prevented from occurring while the second domain 38 is in the state. Accordingly, a missed action tracker 40c may document the periodic action as a missed event with respect to the second domain 38. The missed action tracker 40c may also issue one or more state control signals 46 to selectively place the second domain 38 into the state, as well as one or more action control signals 48 to trigger one or more instances of the periodic action (e.g., at an accelerated rate relative to a default rate associated with the periodic action). Implementing the scheduler apparatus 40 in the first domain 36, which may not enter the state enables the illustrated solution to achieve optimal power consumption and/or performance.

Figure 4:
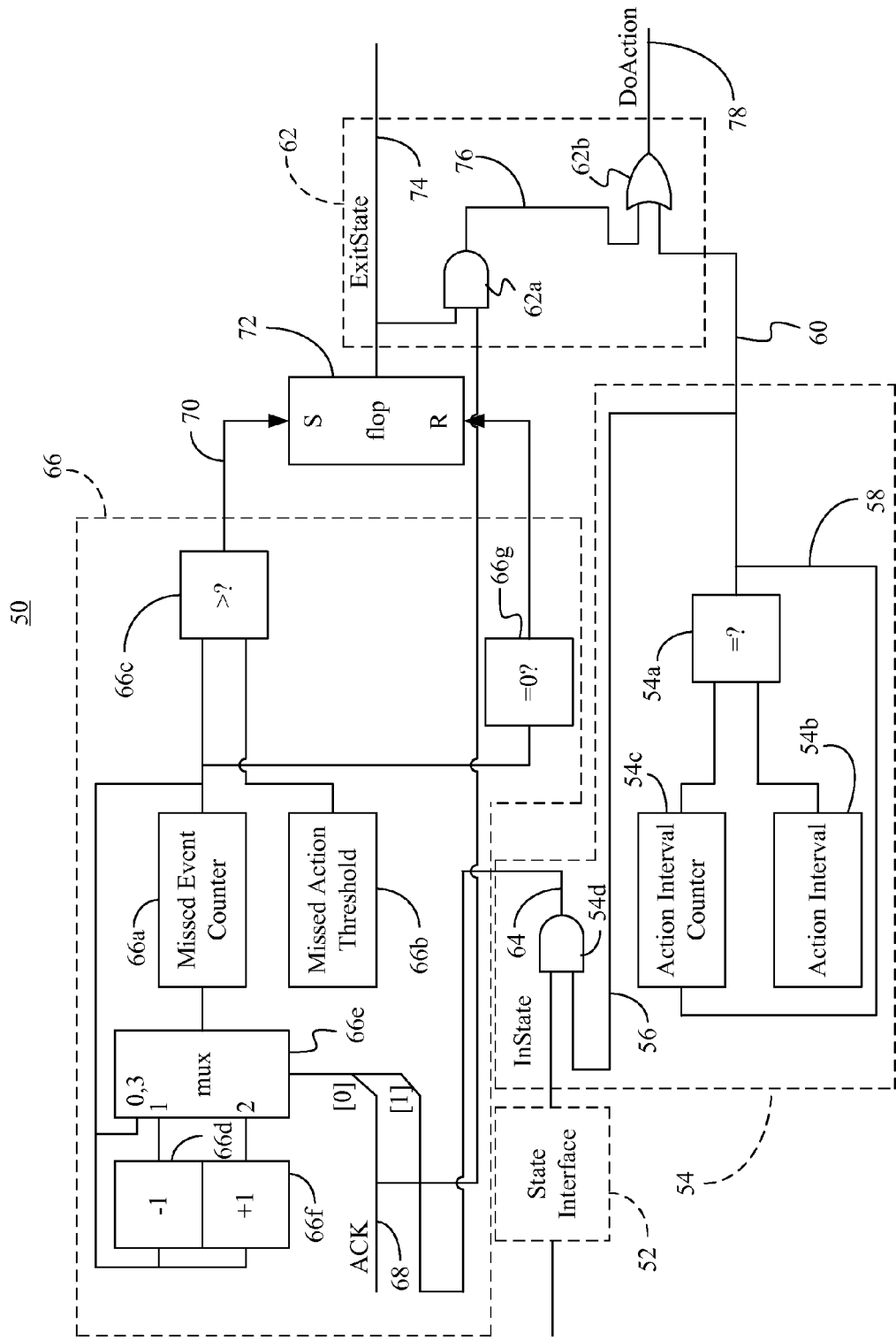
FIG. 4 is a schematic diagram of more detailed example of a scheduler apparatus according to an embodiment.

FIG. 4 shows a more detailed example of a scheduler apparatus 50. The scheduler apparatus 50 may therefore be readily substituted for the scheduler apparatus 40 (FIG. 3), already discussed. In the illustrated example, a state interface 52 determines, in a first domain that manages a state (e.g., reduced power state, increased performance state) of a second domain, that the second domain is in the state. In the illustrated example, the "InState" signal being asserted indicates that the second domain is in the state in question. A missed action detector 54 (54a-54d) may determine, in the first domain, that a periodic action prevented by the state has been scheduled to occur in the second domain while the second domain is in the state. In the illustrated example, a comparator 54a compares (e.g., only upper eight bits) an action interval setting 54b to an action interval counter 54c, wherein the periodic action may be scheduled to occur when the two values are equal. In such a case, the illustrated example a signal is asserted on 1) a line 56 to notify an AND component 54d of the condition, 2) a line 58 to reset the action interval counter 54c, and 3) a line 60 to notify a trigger component 62 (62a, 62b) of the condition.

If both inputs are asserted to the illustrated AND component 54d, a missed action signal is asserted on a line 64 to a missed action tracker 66 (66a-66g). The missed action tracker 66 may generally document the periodic action as a missed event with respect to the second domain. More particularly, the illustrated missed action tracker 66 includes an incrementer 66f to increment a missed event counter 66a, via a multiplexer 66e, in order to document the periodic action as a missed event. Similarly, a decrementer 66d may decrement the missed event counter 66a, via the multiplexer 66e, in response to an acknowledgement signal ("ACK") received on a line 68. The acknowledgement signal may acknowledge completion of each instance of the periodic action. Additionally, a first comparator 66c may compare the missed event counter 66a to a missed action threshold setting 66b and assert a signal on a line 70 to a flop component 72 when the value of the missed event counter 66a reaches the threshold setting. Asserting the signal on the line 70 may cause the flop component 72 to assert an "ExitState" signal on a line 74, wherein the ExitState signal removes the second domain from the state in question. The ExitState signal may therefore be similar to one or more of the state control signals 46 (FIG. 3), already discussed.

The missed action tracker 66 may also include a second comparator 66g that compares to missed event counter 66a to another threshold (e.g., zero, less than zero), and resets the flop component 72 when the missed event counter 66a is decremented to the other threshold. Thus, a value of zero (as shown) may enable the second domain to catch up with the default schedule, whereas a value of less than zero may enable the second domain to get ahead of the default schedule. The illustrated trigger component 62 includes an AND component 62a that asserts a signal on a line 76 when both the ExitState signal and the ACK signal are detected at the same time. The signal asserted on the illustrated line 76 therefore indicates that the second domain is being forced out of state in question by the scheduler apparatus 50 and an instance of the periodic action has just completed. Accordingly, an OR component 62b in the trigger component 62 may assert a "DoAction" signal on a line 78 if either the AND component 62a asserts the signal on the line 76 or the missed event detector asserts the signal on the line 60.

Figure 5:
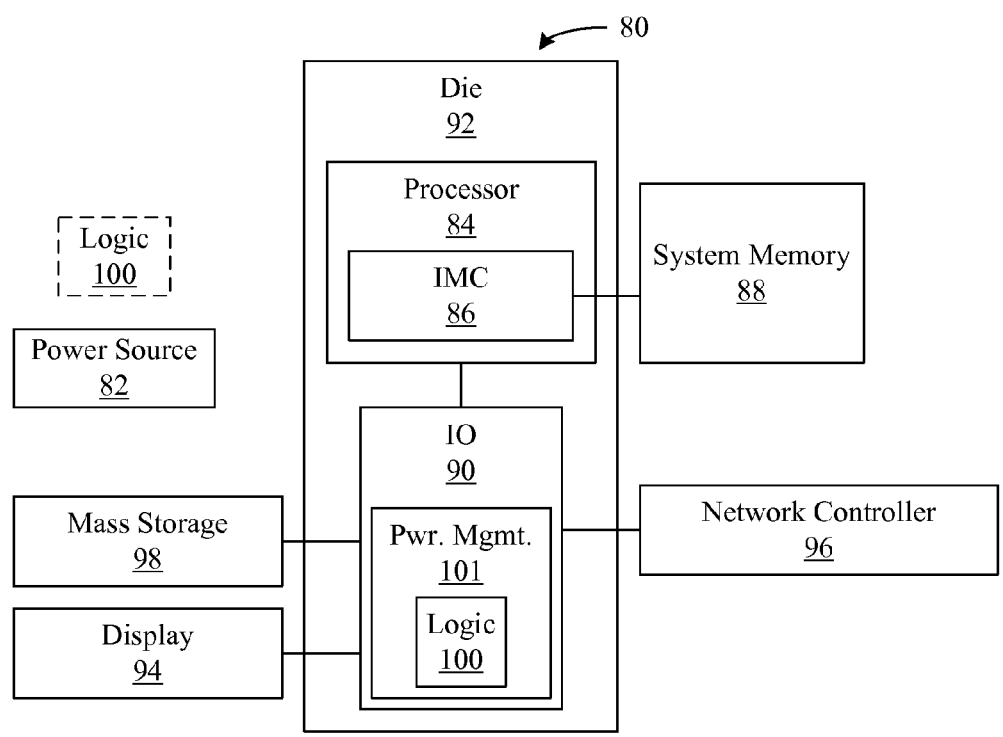
FIG. 5 is an illustration of an example of a computing system according to an embodiment.

FIG. 5 shows a computing system 80. The computing system 80 may be part of an electronic device/platform having computing functionality (e.g., personal digital assistant/PDA, notebook computer, tablet computer, server), communications functionality (e.g., wireless smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 80 includes a power source 82 to supply power to the system 80 and a processor 84 having an integrated memory controller (IMC) 86, which may communicate with system memory 88. The system memory 88 may include, for example, dynamic random access memory (DRAM) configured as one or more memory modules such as, for example, dual inline memory modules (DIMMs), small outline DIMMs (SODIMMs), etc.

The illustrated system 80 also includes an input output (IO) module 90 implemented together with the processor 84 on a semiconductor die 92 as a system on chip (SoC), wherein the IO module 90 functions as a host device and may communicate with, for example, a display 94 (e.g., touch screen, liquid crystal display/LCD, light emitting diode/LED display), a network controller 96, and mass storage 98 (e.g., hard disk drive/HDD, optical disk, flash memory, etc.). The illustrated IO module 90 may execute logic 100 that determines, in a first domain that manages a state of a second domain, that the second domain is in the state, and determines, in the first domain, that a periodic action has been scheduled to occur in the second domain while the second domain is in the state. The IO module 90 may also document the periodic action as a missed event with respect to the second domain. Thus, the logic 100 may perform one or more aspects of the method 10 (FIG. 1), already discussed. The logic 100 may also accelerate completion of missed periodic actions as shown in the method 18 (FIG. 2A) and/or the method 28 (FIG. 2B). In one example, the periodic action is a memory scrub to be performed on the system memory 88, the first domain is a power management subsystem 101, and the second domain includes the IMC 86.

Additional Notes and Examples

Example 1 may include a patrol scrub computing system comprising a memory controller, a memory coupled to the memory controller, and a power management subsystem that manages a state of the memory controller, the power management subsystem comprising a scheduler apparatus that includes a state interface to determine that the memory controller is in the state, a missed action detector to determine that a periodic action has been scheduled to occur in the memory controller while the memory controller is in the state, and a missed action tracker to document the periodic action as a missed event with respect to the memory controller.

Example 2 may include the system of Example 1, further including a missed event counter, wherein the missed action tracker is to increment the missed event counter to document the periodic action.

Example 3 may include the system of Example 2, wherein the scheduler apparatus further includes a flop component to remove the memory controller from the state in response to a value of the missed event counter reaching a threshold, and a trigger component to trigger one or more instances of the periodic action to occur in the memory controller, wherein the one or more instances are to be triggered based on the value of the missed event counter and at an increased rate relative to a default rate associated with the periodic action, and wherein the flop component is to prevent the first domain from reentering the state until the one or more instances of the periodic action have completed.

Example 4 may include the system of Example 2, wherein the scheduler apparatus further includes a trigger component to trigger one or more instances of the periodic action to occur in the memory controller in response to a determination that the memory controller has exited from the state, and wherein the one or more instances are to be triggered based on a value of the missed event counter and at an increased rate relative to a default rate associated with the periodic action, and a flop component to prevent the memory controller from reentering the state until the one or more instances of the periodic action have completed.

Example 5 may include the system of Example 2, wherein the missed action tracker is to receive an acknowledgement of a completion of one or more instances of the periodic action and decrement the missed event counter in response to the acknowledgement.

Example 6 may include the system of any one of Examples 1 to 5, wherein the periodic action is to be precluded from occurring while the memory controller is in the state and the state is to be one of a reduced power state or an increased performance state.

Example 7 may include a scheduler apparatus comprising a state interface to determine, in a first domain that manages a state of a second domain, that the second domain is in the state, a missed action detector to determine, in the first domain, that a periodic action has been scheduled to occur in the second domain while the second domain is in the state, and a missed action tracker to document the periodic action as a missed event with respect to the second domain.

Example 8 may include the apparatus of Example 7, further including a missed event counter, wherein the missed action tracker is to increment the missed event counter to document the periodic action.

Example 9 may include the apparatus of Example 8, wherein the first domain further includes a flop component to remove the second domain from the state in response to a value of the missed event counter reaching a threshold, and a trigger component to trigger one or more instances of the periodic action to occur in the second domain, wherein the one or more instances are to be triggered based on the value of the missed event counter and at an increased rate relative to a default rate associated with the periodic action, and wherein the flop component is to prevent the second domain from reentering the state until the one or more instances of the periodic action have completed.

Example 10 may include the apparatus of Example 8, wherein the first domain further includes a trigger component to trigger one or more instances of the periodic action to occur in the second domain in response to a determination that the second domain has exited from the state, and wherein the one or more instances are to be triggered based on a value of the missed event counter and at an increased rate relative to a default rate associated with the periodic action, and a flop component to prevent the second domain from reentering the state until the one or more instances of the periodic action have completed.

Example 11 may include the apparatus of Example 8, wherein the missed action tracker is to receive an acknowledgement of a completion of one or more instances of the periodic action and decrement the missed event counter in response to the acknowledgement.

Example 12 may include the apparatus of any one of Examples 7 to 11, wherein the periodic action is to be precluded from occurring while the second domain is in the state and the state is to be one of a reduced power state or an increased performance state.

Example 13 may include a method of tracking periodic actions across state domains comprising determining, in a first domain that manages a state of a second domain, that the second domain is in the state, determining, in the first domain, that a periodic action has been scheduled to occur in the second domain while the second domain is in the state, and documenting the periodic action as a missed event with respect to the second domain.

Example 14 may include the method of Example 13, wherein documenting the periodic action includes incrementing a missed event counter.

Example 15 may include the method of Example 14, further including removing the second domain from the state in response to a value of the missed event counter reaching a threshold, triggering one or more instances of the periodic action to occur in the second domain, wherein the one or more instances are triggered based on the value of the missed event counter and at an increased rate relative to a default rate associated with the periodic action, and preventing the second domain from reentering the state until the one or more instances of the periodic action have completed.

Example 16 may include the method of Example 14, further including triggering one or more instances of the periodic action to occur in the second domain in response to a determination that the second domain has exited from the state, wherein the one or more instances are triggered based on a value of the missed event counter and at an increased rate relative to a default rate associated with the periodic action, and preventing the second domain from reentering the state until the one or more instances of the periodic action have completed.

Example 17 may include the method of Example 14, further including receiving an acknowledgement of a completion of one or more instances of the periodic action, and decrementing the missed event counter in response to the acknowledgement.

Example 18 may include the method of any one of Examples 13 to 17, wherein the periodic action is precluded from occurring while the second domain is in the state and the state is one of a reduced power state or an increased performance state.

Example 19 may include at least one computer readable storage medium comprising a set of instructions, which when executed by a computing system, cause the computing system to determine, in a first domain that manages a state of a second domain, that the second domain is in the state, determine, in the first domain, that a periodic action has been scheduled to occur in the second domain while the second domain is in the state, and documenting the periodic action as a missed event with respect to the second domain.

Example 20 may include the at least one computer readable storage medium of Example 19, wherein the instructions, when executed, cause a computing system to increment a missed event counter to document the periodic action.

Example 21 may include the at least one computer readable storage medium of Example 20, wherein the instructions, when executed, cause a computing system to remove the second domain from the state in response to a value of the missed event counter reaching a threshold, trigger one or more instances of the periodic action to occur in the second domain, wherein the one or more instances are to be triggered based on the value of the missed event counter and at an increased rate relative to a default rate associated with the periodic action, and prevent the second domain from reentering the state until the one or more instances of the periodic action have completed.

Example 22 may include the at least one computer readable storage medium of Example 20, wherein the instructions, when executed, cause a computing system to trigger one or more instances of the periodic action to occur in the second domain in response to a determination that the second domain has exited from the state, and wherein the one or more instances are to be triggered based on a value of the missed event counter and at an increased rate relative to a default rate associated with the periodic action, and prevent the second domain from reentering the state until the one or more instances of the periodic action have completed.

Example 23 may include the at least one computer readable storage medium of Example 20, wherein the instructions, when executed, cause a computing system to receive an acknowledgement of a completion of one or more instances of the periodic action, and decrement the missed event counter in response to the acknowledgement.

Example 24 may include the at least one computer readable storage medium of any one of Examples 19 to 23, wherein the periodic action is to be precluded from occurring while the second domain is in the state and the state is to be one of a reduced power state or an increased performance state.

Example 25 may include a scheduler apparatus comprising means for determining, in a first domain that manages a state of a second domain, that the second domain is in the state, means for determining, in the first domain, that a periodic action has been scheduled to occur in the second domain while the second domain is in the state, and means for documenting the periodic action as a missed event with respect to the second domain.

Example 26 may include the apparatus of Example 25, wherein the means for documenting the periodic action includes means for incrementing a missed event counter.

Example 27 may include the apparatus of Example 26, further including means for removing the second domain from the state in response to a value of the missed event counter reaching a threshold, means for triggering one or more instances of the periodic action to occur in the second domain, wherein the one or more instances are to be triggered based on the value of the missed event counter and at an increased rate relative to a default rate associated with the periodic action, and means for preventing the second domain from reentering the state until the one or more instances of the periodic action have completed.

Example 28 may include the apparatus of Example 26, further including means for triggering one or more instances of the periodic action to occur in the second domain in response to a determination that the second domain has exited from the state, wherein the one or more instances are to be triggered based on a value of the missed event counter and at an increased rate relative to a default rate associated with the periodic action, and means for preventing the second domain from reentering the state until the one or more instances of the periodic action have completed.

Example 29 may include the apparatus of Example 26 further including means for receiving an acknowledgement of a completion of one or more instances of the periodic action, and means for decrementing the missed event counter in response to the acknowledgement.

Example 30 may include the apparatus of any one of Examples 25 to 29, wherein the periodic action is to be precluded from occurring while the second domain is in the state and the state is to be one of a reduced power state or an increased performance state.

Techniques described herein may therefore support reliability, availability and serviceability features for memory error handling with a more power efficient guarantee of memory scrubbing. Moreover, the techniques may be applied to other periodic functions such as, for example, periodic calibrations, compensation value reevaluations, and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a memory controller;
a memory coupled to the memory controller;
a power management subsystem that manages a state of the memory controller, the power management subsystem comprising a scheduler apparatus that includes:
a state interface to determine that the memory controller is in the state,
a missed action detector to determine that a periodic action has been scheduled to occur in the memory controller while the memory controller is in the state, and
a missed action tracker to document the periodic action as a missed event with respect to the memory controller; and
a missed event counter, wherein the missed action tracker is to receive an acknowledgement of a completion of one or more instances of the periodic action and decrement the missed event counter in response to the acknowledgement.

2. The system of claim 1, wherein the missed action tracker is to increment the missed event counter to document the periodic action.

3. The system of claim 2, wherein the scheduler apparatus further includes:
a flop component to remove the memory controller from the state in response to a value of the missed event counter reaching a threshold; and
a trigger component to trigger one or more instances of the periodic action to occur in the memory controller, wherein the one or more instances are to be triggered based on the value of the missed event counter and at an increased rate relative to a default rate associated with the periodic action, and wherein the flop component is to prevent the first domain from reentering the state until the one or more instances of the periodic action have completed.

4. The system of claim 2, wherein the scheduler apparatus further includes:
a trigger component to trigger one or more instances of the periodic action to occur in the memory controller in response to a determination that the memory controller has exited from the state, and wherein the one or more instances are to be triggered based on a value of the missed event counter and at an increased rate relative to a default rate associated with the periodic action; and
a flop component to prevent the memory controller from reentering the state until the one or more instances of the periodic action have completed.

5. The system of claim 1, wherein the periodic action is to be prevented from occurring while the memory controller is in the state and the state is to be one of a reduced power state or an increased performance state.

6. An apparatus comprising:
a state interface to determine, in a first domain that manages a state of a second domain, that the second domain is in the state;
a missed action detector to determine, in the first domain, that a periodic action has been scheduled to occur in the second domain while the second domain is in the state;
a missed action tracker to document the periodic action as a missed event with respect to the second domain; and
a missed event counter, wherein the missed action tracker is to receive an acknowledgement of a completion of one or more instances of the periodic action and decrement the missed event counter in response to the acknowledgement.

7. The apparatus of claim 6, wherein the missed action tracker is to increment the missed event counter to document the periodic action.

8. The apparatus of claim 7, wherein the first domain further includes:
a flop component to remove the second domain from the state in response to a value of the missed event counter reaching a threshold; and
a trigger component to trigger one or more instances of the periodic action to occur in the second domain, wherein the one or more instances are to be triggered based on the value of the missed event counter and at an increased rate relative to a default rate associated with the periodic action, and wherein the flop component is to prevent the second domain from reentering the state until the one or more instances of the periodic action have completed.

9. The apparatus of claim 7, wherein the first domain further includes:
a trigger component to trigger one or more instances of the periodic action to occur in the second domain in response to a determination that the second domain has exited from the state, and wherein the one or more instances are to be triggered based on a value of the missed event counter and at an increased rate relative to a default rate associated with the periodic action; and
a flop component to prevent the second domain from reentering the state until the one or more instances of the periodic action have completed.

10. The apparatus of claim 6, wherein the periodic action is to be prevented from occurring while the second domain is in the state and the state is to be one of a reduced power state or an increased performance state.

11. A method comprising:
determining, in a first domain that manages a state of a second domain, that the second domain is in the state;
determining, in the first domain, that a periodic action has been scheduled to occur in the second domain while the second domain is in the state;
documenting the periodic action as a missed event with respect to the second domain, receiving an acknowledgement of a completion of one or more instances of the periodic action; and
decrementing a missed event counter in response to the acknowledgement.

12. The method of claim 11, wherein documenting the periodic action includes incrementing a missed event counter.

13. The method of claim 12, further including:
removing the second domain from the state in response to a value of the missed event counter reaching a threshold;
triggering one or more instances of the periodic action to occur in the second domain, wherein the one or more instances are triggered based on the value of the missed event counter and at an increased rate relative to a default rate associated with the periodic action; and
preventing the second domain from reentering the state until the one or more instances of the periodic action have completed.

14. The method of claim 12, further including:
triggering one or more instances of the periodic action to occur in the second domain in response to a determination that the second domain has exited from the state, wherein the one or more instances are triggered based on a value of the missed event counter and at an increased rate relative to a default rate associated with the periodic action; and
preventing the second domain from reentering the state until the one or more instances of the periodic action have completed.

15. The method of claim 11, wherein the periodic action is prevented from occurring while the second domain is in the state and the state is one of a reduced power state or an increased performance state.

16. At least one non-transitory computer readable storage medium comprising a set of instructions, which when executed by a computing system, cause the computing system to:
determine, in a first domain that manages a state of a second domain, that the second domain is in the state;
determine, in the first domain, that a periodic action has been scheduled to occur in the second domain while the second domain is in the state;
document the periodic action as a missed event with respect to the second domain;
receive an acknowledgement of a completion of one or more instances of the periodic action; and
decrement a missed event counter in response to the acknowledgement.

17. The at least one non-transitory computer readable storage medium of claim 16, wherein the instructions, when executed, cause a computing system to increment a missed event counter to document the periodic action.

18. The at least one non-transitory computer readable storage medium of claim 17, wherein the instructions, when executed, cause a computing system to:
remove the second domain from the state in response to a value of the missed event counter reaching a threshold;
trigger one or more instances of the periodic action to occur in the second domain, wherein the one or more instances are to be triggered based on the value of the missed event counter and at an increased rate relative to a default rate associated with the periodic action; and
prevent the second domain from reentering the state until the one or more instances of the periodic action have completed.

19. The at least one non-transitory computer readable storage medium of claim 17, wherein the instructions, when executed, cause a computing system to:
trigger one or more instances of the periodic action to occur in the second domain in response to a determination that the second domain has exited from the state, and wherein the one or more instances are to be triggered based on a value of the missed event counter and at an increased rate relative to a default rate associated with the periodic action; and prevent the second domain from reentering the state until the one or more instances of the periodic action have completed.

20. The at least one non-transitory computer readable storage medium of claim 16, wherein the periodic action is to be prevented from occurring while the second domain is in the state and the state is to be one of a reduced power state or an increased performance state.

* * * * *